(12) United States Patent
Chang

(10) Patent No.: US 7,697,061 B2
(45) Date of Patent: Apr. 13, 2010

(54) APPARATUS FOR INCREASING FIELD OF VIEW OF AN OPTICAL SYSTEM

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 936 days.

(21) Appl. No.: 11/410,235

(22) Filed: Apr. 24, 2006

(65) Prior Publication Data
US 2006/0285003 A1    Dec. 21, 2006

(30) Foreign Application Priority Data
Jun. 17, 2005    (CN) .................... 2005 1 0035394

(51) Int. Cl.
*H04N 5/238* (2006.01)
*H04N 5/225* (2006.01)
(52) U.S. Cl. .................... 348/369; 348/340; 348/373
(58) Field of Classification Search ......... 348/144–147, 348/369, 373–376, 340, 36–39, 207.99; D16/130, D16/136, 200
See application file for complete search history.

(56) References Cited

U.S. PATENT DOCUMENTS

| | | | | |
|---|---|---|---|---|
| 3,706,848 A | * | 12/1972 | Rouet ........................ 348/369 |
| 4,378,952 A | * | 4/1983 | Siegmund .................... 385/116 |
| 4,633,317 A | * | 12/1986 | Uwira et al. ............. 348/219.1 |
| 5,363,136 A | * | 11/1994 | Sztanko et al. ......... 348/207.99 |
| 5,400,070 A | * | 3/1995 | Johnson et al. .......... 348/219.1 |
| 5,561,460 A | * | 10/1996 | Katoh et al. ............. 348/219.1 |
| 5,877,806 A | * | 3/1999 | Kawano ................... 348/219.1 |
| 6,034,716 A | * | 3/2000 | Whiting et al. ................ 348/36 |
| 6,084,841 A | * | 7/2000 | Sugiura et al. ......... 369/112.21 |
| 6,876,544 B2 | * | 4/2005 | Hsin ........................ 361/679 |
| 7,432,977 B2 | * | 10/2008 | Chiang ........................ 348/373 |
| 2002/0061767 A1 | * | 5/2002 | Sladen et al. ............... 455/556 |

* cited by examiner

*Primary Examiner*—David L Ometz
*Assistant Examiner*—Richard M Bemben
(74) *Attorney, Agent, or Firm*—Steven M. Reiss

(57) ABSTRACT

An apparatus (200) for increasing field of view of optical system is provided. The optical system includes a lens module (20). The apparatus comprises a rotational mechanism (30) rotatably mounted in the optical system. The rotational mechanism includes a refraction means disposed on an optical axis of the lens module and configured for refracting a light signal from outside of the optical system into the lens module. The apparatus may be used in optical systems, such as camera modules, digital video cameras, image pick-up systems used in cars, infrared optical systems, projection optical systems, and real-time detector systems.

3 Claims, 3 Drawing Sheets

APPARATUS FOR INCREASING FIELD OF VIEW OF AN OPTICAL SYSTEM

BACKGROUND OF THE INVENTION

1. Field of the Invention

The present invention relates to an apparatus for increasing field of view of an optical system.

2. Discussion of the Related Art

Generally, Many different types of optical systems such as digital cameras, digital video cameras, image pick-up systems used in cars, and real-time detector systems, are known and have different properties which may be of potential relative advantage in particular applications. However, application of some types of optical systems for purposes in which they might be otherwise advantageous may be precluded by corresponding constraints. As a simple example, large fields of view must generally be provided by wide-angle lenses, which characteristically exhibit substantial distortion that increases with off-axis angle. Correction of such distortion is often only possible with expensive aspheric elements or by using image processing which is expensive. However, it is difficult to achieve a relatively wide angle of view as required to accommodate the size of objects of interest while maintaining the overall system (object, lens, and camera/sensor) at an acceptable size.

What is needed, therefore, is an apparatus for increasing field of view of optical system, which satisfies the needs for performance enhancement, with low distortion.

SUMMARY OF THE INVENTION

In one aspect, an apparatus for increasing field of view of optical system is provided. The optical system includes a lens module. The apparatus comprises a rotational mechanism rotatably mounted in the optical system. The rotational mechanism includes a refraction means disposed on an optical axis of the lens module and configured for refracting a light signal from outside of the optical system into the lens module.

Other advantages and novel features will become more apparent from the following detailed description when taken in conjunction with the accompanying drawings.

BRIEF DESCRIPTION OF THE DRAWINGS

Many aspects of the apparatus for increasing field of view of optical system can be better understood with reference to the following drawings. The components in the drawings are not necessarily drawn to scale, the emphasis instead being placed upon clearly illustrating the principles of the present the apparatus for increasing field of view of optical system. Moreover, in the drawings, like reference numerals designate corresponding parts throughout the several views.

DETAILED DESCRIPTION OF PREFERRED EMBODIMENTS

Figure 1:
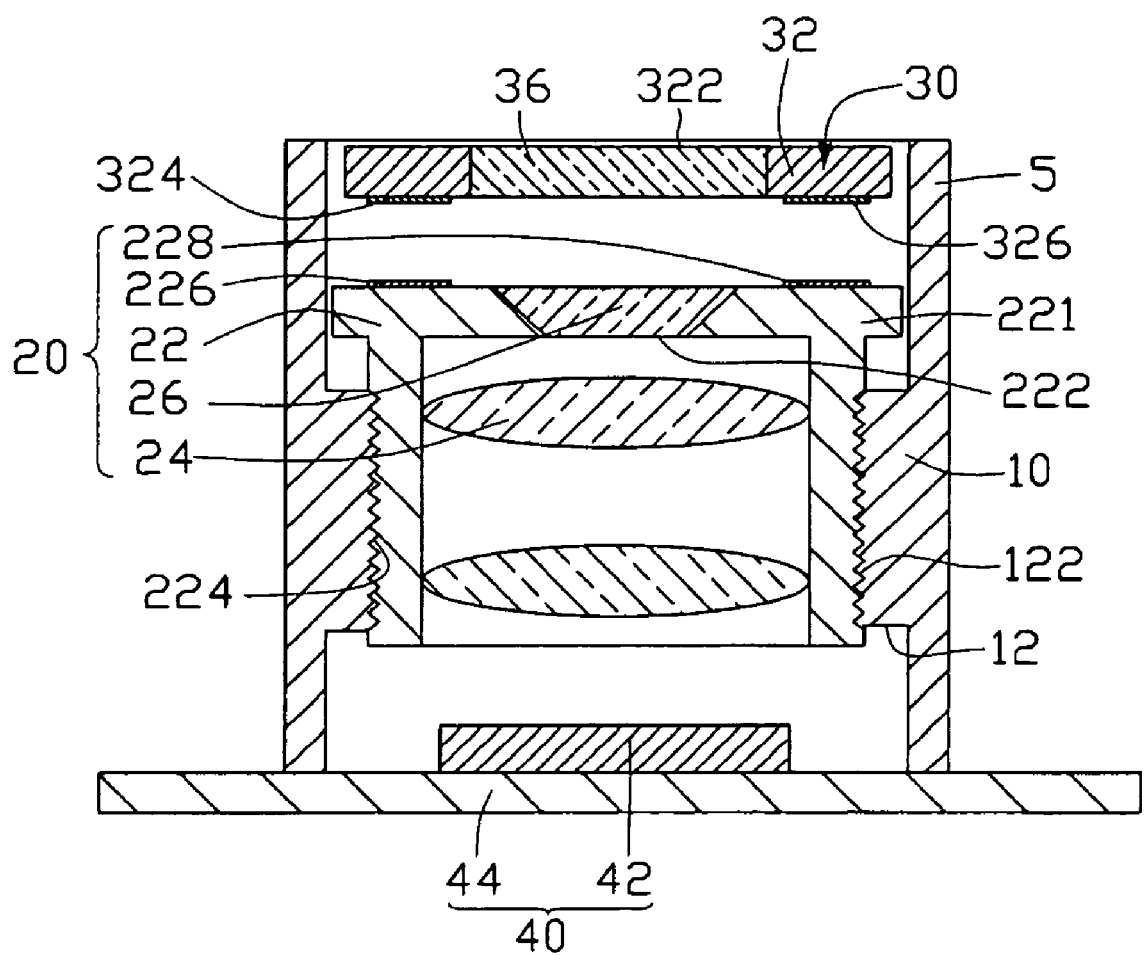
FIG. 1 is a schematic view of a digital camera module including an apparatus for increasing field of view of the digital camera module, in accordance with one preferred embodiment.

Referring now to the drawings, FIG. 1 shows an optical system such as a digital camera module 100, which includes an apparatus (not labelled) for increasing a field of view of the digital camera module, according to a preferred embodiment. It should be noted that the apparatus for increasing a field of view of the optical system may also, for example, be used with other optical systems, such as digital video cameras, image pick-up systems used in cars, infrared optical systems, projection optical systems, and real-time detector systems. The digital camera module 100 is adapted for use in a portable electronic device such as a mobile phone or a personal digital assistant (PDA), but the compact nature thereof could prove useful in compact digital camera units or digital camcorders, as well. The digital camera module 100 includes a lens holder 10, a lens module 20, the apparatus for increasing field of view of the digital camera module 100, and an image pick-up module 40. The lens holder 10 is mounted on and/or above the image pick-up module 40. The lens holder 10 receives the rotational mechanism 30 and the lens module 20, in that order.

The lens holder 10 defines a receiving cavity (not labeled) inside. The lens holder 10 has a round protrusion 12 axially extending from an inner periphery thereof The round protrusion 12 defines an internal thread 122 therein. The lens holder 10 has a pair of openings 14 symmetrically defined in a periphery therein and adjacent one end thereof.

Figure 2:
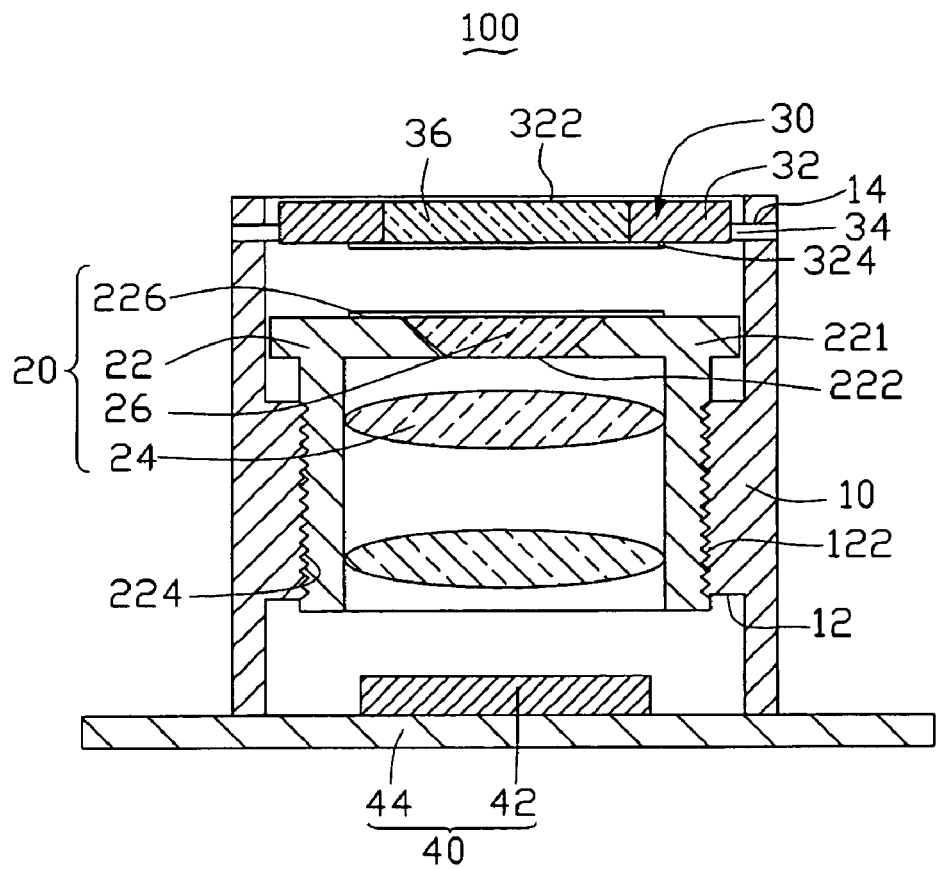
FIG. 2 is similar to FIG. 2, but showing another aspect.
Figure 3:
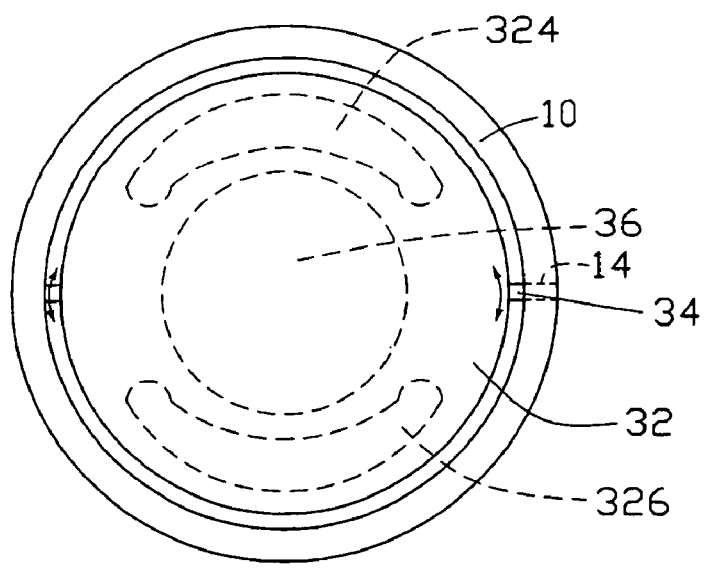
FIG. 3 is a top view of a rotational mechanism of the digital camera module of FIG. 2.

Referring also to FIGS. 2 and 3, the lens module 20 includes a lens barrel 22, at least one lens group 24, and a transparent cover 26. The lens barrel 20 is a hollow cylinder with an open end (not labeled) and a half-closed (i.e., partially-closed) end 221 and receives the lens group 24. The lens barrel 22 defines a hole 222 in the center of the half-closed end 221 so that light beams can be transmitted therethrough. The lens barrel 22 defines an external thread 224. The lens barrel 22 is axially located in the receiving cavity of the holder 10. Thread-engagement of the external thread 224 of the lens barrel 22 and the internal thread 122 of the lens holder 10 allows the lens module 20 to be axially movable in the lens holder 10. The lens barrel 22 has two electromagnets 226, 228 symmetrically and circumferentially formed on a top of the half-closed end 221.

The apparatus 200 for increasing field of view of the digital camera module 100 includes a rotational mechanism 30 and the two electromagnets 226, 228. The rotational mechanism 30 includes a rotational plate 32 having a center hole 322 defined therein, a rotational shaft 34 extending symmetrically from an outer periphery of the rotational plate 32, and a transparent mirror 36 as a refraction means securely received in the center hole 322 of the rotational plate 32. The rotational shaft 34 is rotatably received in the openings 14 of the lens holder 10. The rotational plate 32 is manufactured by means of injection moldings. The rotational plate 32 has two permanent magnets 324, 326 symmetrically and circumferentially formed on a bottom thereof, corresponding to the electromagnets 226, 228. An outer electric field can be exerted on the electromagnets 226, 228 such that a repulsive or attractive force is produced between the electromagnet 226 and the magnet 324, and between the electromagnet 228 and the magnet 326. The repulsive or attractive force drives the rotational plate 32 to rotate relative to the lens holder 10. Therefore, the transparent mirror 36 rotates to an angle. The transparent mirror 36 can be made of glass or plastic material.

The image pick-up module 40 includes an image pick-up sensor 42, and a printed circuit board 44. The image pick-up sensor 42 can, for example, be a complementary metal-oxide semiconductor (CMOS) type sensor or a charge coupled device (CCD). The image pick-up sensor 42 is electrically connected with the printed circuit board 44 so that an image signal can be output to a signal processing unit (not labeled). The image pick-up sensor 42 is disposed on a center of the printed circuit board 44. The image pick-up sensor 42 aligns with the open end of the lens holder 10 and the optical axis of the lens group 24 such that the lens holder 10 is capable of routing the input light beams, corresponding to an image being photographed, to the image pick-up sensor 42.

Figure 4:
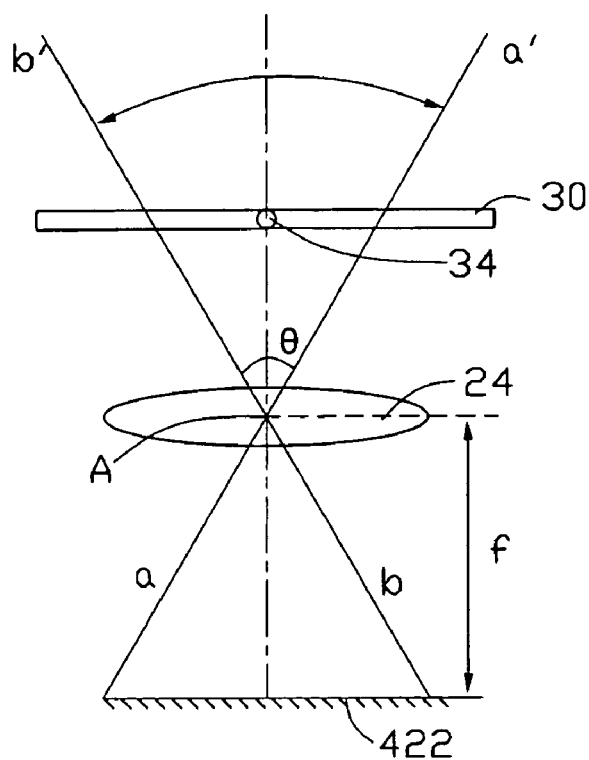
FIG. 4 is an explanatory view of field of view of the digital camera module without the rotational mechanism.

Referring to FIG. 4, an image plane 422 is formed on the image pickup sensor 42 when light beams transmit through the lens group 24 and irradiate the image pick-up sensor 42. An angle determined by a lens node A of the lens group 24 and two ends of the image plane 422 is defined as an angle of coverage, and an opposite but equal angle is defined as an angle of field of view designated as θ. When the rotational mechanism 30 is not installed in the lens holder 10, an area determined by line a' (an extending line of line a) and line b' (an extending line of line b) is designated as field of view, which is defined by the arrow of FIG. 3.

Figure 5:
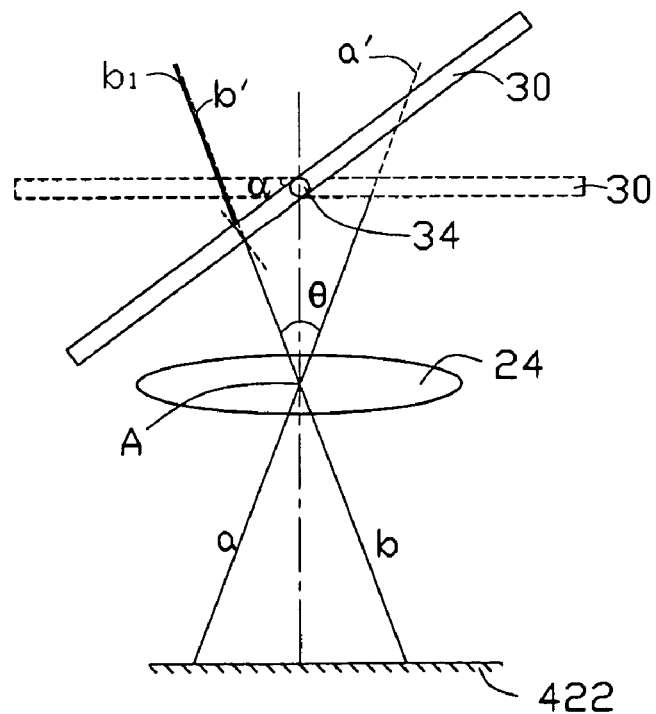
FIG. 5 is an explanatory view of field of view of the digital camera module with the rotational mechanism.

Referring to FIG. 5, when the rotational mechanism 30 is installed in the lens holder 10 and rotated counter-clockwise as shown in FIG. 4, the angle of field of view θ is maintained because a distance between the lens group 24 and the image pick-up sensor 42 does not change. However, the field of view can be changed. For the sake of descriptive briefness, an example explanation is based on the left side of FIG. 4. A light beam is refracted by the transparent mirror 36 and incident on the lens group 24, and then forms an image on the image plane 422. The line b' is an incident light border. That is, incident light beams outside of the line b' cannot form an image on the image plane 422. According to the phenomena of reversibility of light, it can be assumed that the line b is incident on the transparent mirror 36. When the transparent mirror 36 is rotated by an angle designated as α, an incident angle of the line b also changes. Emergent light line b1 has a displacement toward the left relative to the line b' above a top of the transparent mirror 36 because of a refraction of the transparent mirror 36. The emergent light b1 is parallel to the line b'. The shadow between the light b1 and line b' is an extended area of field of view. Similarly, when the rotational mechanism 30 is rotated clockwise, there is also an extended area of field of view to the right of line a'. Images are gathered during the rotation of the transparent mirror 36, and a synthesizing image means disposed in a digital camera with the digital camera module synthesizes the images received by the image pick-up sensor 42 into a single image with an extended field of view.

It can be seen that the greater the displacement of the line b1, the larger the extended area of field of view. The displacement of the line b1 is related to a thickness and a refractive index of the transparent mirror 36.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical system, comprising:
a cylindrically-shaped lens holder;
a lens module including at least one lens group received therein, the lens module received in the lens holder, the lens module further comprises a lens barrel receiving the at least one lens group, the lens barrel including a pair of electromagnets;
a rotational mechanism rotatably mounted to the lens holder, the rotational mechanism including only one transparent mirror disposed on an optical axis of the lens module, and the transparent mirror configured for being rotated by the rotational mechanism and simultaneously refracting a light signal from outside of the optical system into the lens module to extend the field of view for the lens module, the rotational mechanism comprising a rotational plate defining a center hole, the transparent mirror engagingly secured in the center hole, the rotational plate having a pair of permanent magnets attached on the surface thereof, a magnetic force produced between the electromagnets and the magnets rotating the rotational plate relative to the lens holder; and
an image pick-up module configured for receiving the light signal from the lens module.

2. The optical system as claimed in claim 1, wherein the lens holder has a pair of openings and a pair of rotational shafts, the rotational plate is rotatably mounted in the lens holder via the rotational shafts rotatably secured in the openings.

3. The optical system as claimed in claim 2, wherein the pair of openings are defined in a periphery of the lens holder, and the pair of rotational shafts symmetrically extend from an outer periphery of the rotational plate, the pair of electromagnets are symmetrically and circumferentially disposed on a top of the lens barrel, and the pair of permanent magnets are symmetrically and circumferentially disposed on a bottom of the rotational plate.

* * * * *